UNITED STATES PATENT OFFICE.

SAMUEL L. CROCKER, OF TAUNTON, MASSACHUSETTS.

IMPROVED YELLOW-METAL NAIL OR SPIKE.

Specification forming part of Letters Patent No. 6,354, dated April 17, 1849; Reissue No. 273, dated August 1, 1854; Reissue No. 1,415, dated February 24, 1863.

*To all whom it may concern:*

Be it known that I, SAMUEL L. CROCKER, of Taunton, in the county of Bristol and State of Massachusetts, have invented a new and useful or Improved Yellow-Metal Sheathing Nail or Spike, which by means of a nail-cutting engine is cut from yellow sheathing metal; and I do hereby declare that the same is fully described in the following specification.

The yellow-metal above referred to is a composition of about sixty parts of copper and forty parts of zinc. It is rolled into plates of sufficient thickness and shape to be cut up into nails. It is such a composition as is now extensively used in lieu of sheet-copper for the sheathing of navigable vessels.

In consequence of the difficulties heretofore supposed to exist in the manufacture of yellow-metal nails and spikes, it has been customary to cast or found them from a composition of copper, zinc, and some other metal, it having been discovered that nails could not be made to advantage by casting them from copper and zinc combined together in the proportions of sixty parts of the former to forty of the latter. To do so, either a different proportion of copper and zinc, or an addition of some other metal, was requisite. When in a cold state the yellow metal cannot be used for the manufacture of cut nails or spikes in a nail-cutting machine, the great frangibility of the metal preventing the nails or spikes from being cut and headed. I have discovered that by heating it to redness, or thereabout, and while so heated introducing it into the nail or spike machine, it may be safely cut up into nail-blanks, and each of said blanks be headed by the machine. After the nails or spikes, as the case may be, have been thus made, they are to be again heated to or about to redness, and when so heated they are to be plunged into cold water. In consequence thereof, their brittleness will be so overcome as to render them capable of being bent or driven without that danger of being broken under such operations as the common cast composition nails or spikes would be subject to. This mode of making either a nail or a spike of the yellow metal enables me to produce one which, although it may have but two-thirds the amount of metal in it that a cast composition nail or spike may have, yet it will possess quite as much, if not more, strength. This renders my yellow-metal nails or spikes, as the case may be, much cheaper than the cast nails or spikes, besides being a far better article, particularly on account of the perfection with which the head is made, the cast composition nail having its head rough and jagged, and so much so that, in consequence thereof, a great objection arises to their use as sheathing-nails. I would further remark that the rough state in which the heads of the cast composition nails are generally found tends to render foul the bottom of the vessel. The heads of the composition nails cannot be smoothed without much expense, to which my yellow-metal nail is not subject, owing to the perfection with which the head of it can be formed by the nail-machine. The yellow-metal nail, made of copper and zinc, in the same or substantially the same proportions as such metals are combined to produce the yellow-metal sheathing, prevents (when it is used to confine the yellow-metal sheathing to a vessel's bottom) any galvanic action, such at takes place when either copper or composition nails are used. This galvanic action destroys the metal, but protects the nails. When the metals are combined in the nail in different proportions to what they are in the sheathing, more or less galvanic action accrues, this always tending to the destruction of the metal immediately around the nails. So when the metals—*i. e.*, copper and zinc—are combined with some other metal—tin, for instance—which they must be in order to enable them to be cast into nails in a workman-like manner or to advantage, such nails, when used to secure sheathing to the bottom of a vessel, are liable to the effects of galvanic action and soon destroy the metal near the heads, whereas my improved yellow-metal nail, being made of the same materials as the sheathing and combined in the same proportions, is not only not subject to galvanic action, but is more durable in consequence thereof, and can be made as strong as the composition nail, with a much less quantity of metal. Consequently it is not only cheaper than either the composition or the copper nails, but possesses advantages of strength and durability which they do not. The cast composition nail or spike, owing to its brittleness, cannot be driven without great care, whereas my yellow-metal nail or spike, being tougher and more malleable, can be driven without the same difficulty.

I wish it distinctly understood that I lay no claim to the invention of either a cast copper nail or a cast composition nail, made of copper and zinc combined in different proportions from that in which they are combined in the yellow metal, (known in commerce as "Muntz's sheathing metal,") or combined in the same proportions and with some other metal; but What I do claim as my invention is—

The new article of manufacture hereinabove described—viz., a yellow-metal nail or spike made by the combined processes of heating the metal to redness, and in such state cutting and heading it in a nail-machine, and subsequently treating it substantially as described—meaning by the term "yellow metal," a metal composed of copper and zinc in the proportions in which they are usually combined in the manufacture of the well-known "Muntz's sheathing metal."

SAML. L. CROCKER.

Witnesses:

R. H. EDDY,

F. R. HALE, Jr.